Sheet 3-3 Sheets.
J. Johnson,
Brick Machine,
Nº 11,482. Patented Aug. 8, 1854.
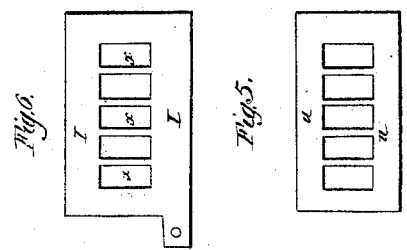
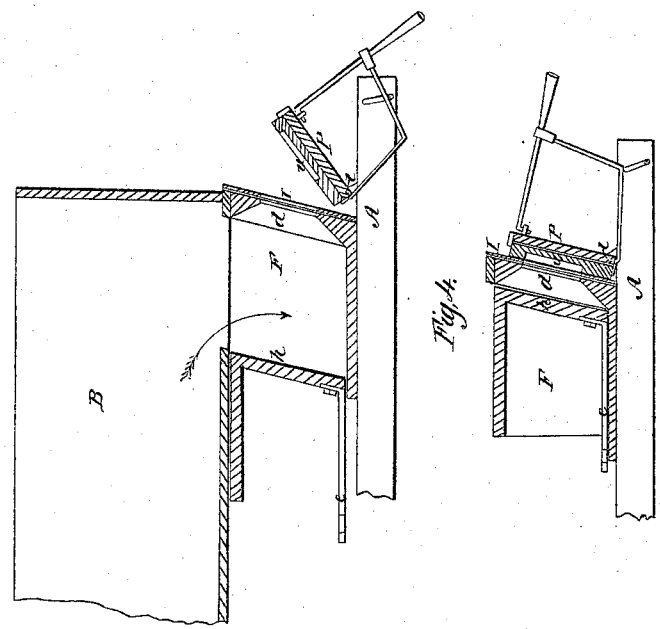
Witnesses.
Inventor
Isaac Johnson

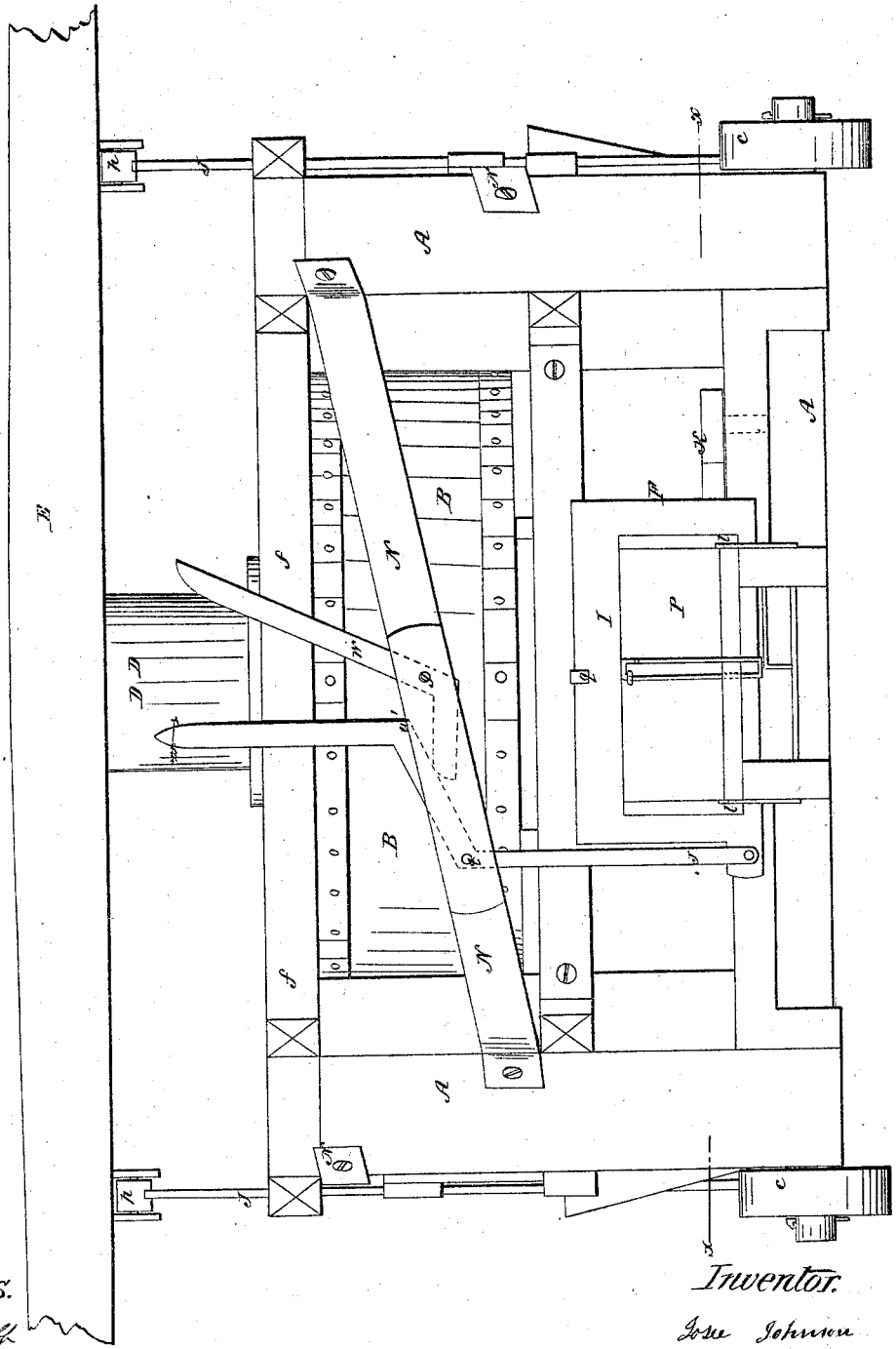

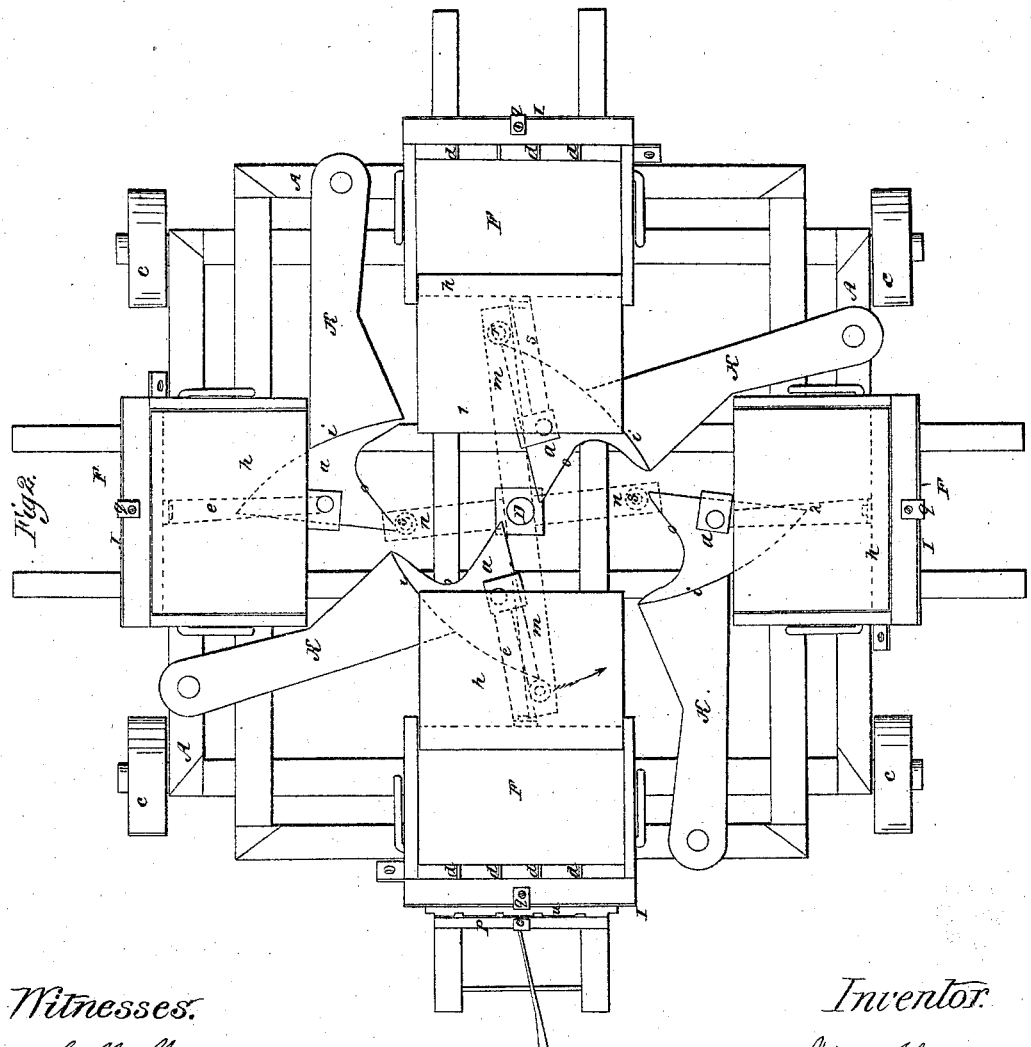

UNITED STATES PATENT OFFICE.

JOSEE JOHNSON, OF FORT SMITH, ARKANSAS.

BRICK-PRESS.

Specification of Letters Patent No. 11,482, dated August 8, 1854.

*To all whom it may concern:*

Be it known that I, JOSEE JOHNSON, of Fort Smith, county of Sebastian, and State of Arkansas, have invented certain new and useful Improvements in Machines for Manufacturing Brick; and I do hereby declare the following to be a full, clear, and exact description of the same, reference being had to the accompanying drawings, forming part of this specification.

Figure 1 represents a side elevation of my improved press complete. Fig. 2 is a horizontal section taken through the line $x$ $x$ of Fig. 1, showing the construction and operation for the mechanism for molding the brick. Fig. 3 is a cross section of one of the hoppers hereinafter referred to, showing the plunger or sliding head in position, previous to the operation of pressing the clay into the mold, and also representing a fragment of the main hopper attached thereto. Fig. 4 is a corresponding section of the same, showing the position of the sliding head and mold after the brick have been cast. Fig. 5 is a side elevation of the mold and Fig. 6, is also a side elevation of the cut-off.

To enable others skilled in the art to make and use my improved press, I will proceed to a description of the same in detail.

(A) represents the frame, constructed and arranged in any convenient manner, and mounted upon wheels (c) for the purpose of conveying said machine with facility to any desired location.

(B) represents the hopper or clay-bed in which the clay is prepared previous to molding the brick. Said hopper is of cylindrical form and may be constructed of any material found advisable.

(D) is the main shaft, supported by cross ties (f) and extends to the lower part of the machine. Upon this shaft the arms for the purpose of grinding and mixing the clay are placed. Attaching arms to a shaft for the purpose of tempering the clay is an old and well known device. A detailed description therefore is deemed unnecessary here.

Upon the upper end of the main shaft (D) is firmly secured a lever or sweep (E) by which the mechanism for tempering the clay and molding the brick is actuated.

(F) are four hoppers, placed on the four opposite sides of the frame and directly beneath the main hopper (B), as seen in Fig. 3. These hoppers are provided with plungers or sliding heads (h) and are operated in the following manner: (a) represent double cams, secured to the inner extremity of levers (K), and attached to the sliding heads (h), by connecting rods (e), Figs. 3 and 4, also represented by dotted lines in Fig. 2. On the lower extremity of the shaft (D) are placed two cross-heads (m) and (n), as shown in red lines in Fig. 2. Near the opposite ends, and on the lower surface of the cross head (m), are placed two friction rollers (r, r,) represented by blue lines. The cross-head being firmly secured to the shaft (D) rotates therewith, causing the friction rollers (r r) to be brought into contact with the outer cams or curved surfaces (i) of the double cams (a), the same being secured to the levers (K), which levers are pivoted at their opposite ends to the frame (A), thus causing by the rotation of the shaft (D), the sliding heads (h) which are secured to the cams (a) by connecting rods (e) to be drawn toward the center in order that the hoppers (F) may receive a fresh supply of prepared clay from the main hopper above. The cross-head (n) which is secured to the shaft (D), is placed at right angles to the cross-head (m), and is also furnished with friction rollers (s, s,) shown in blue lines. These rollers operate on the inner cams or curved surfaces (o) of the cams (a). Thus it will be seen that by drawing alternately the sliding heads (h) toward the center of the machine, by the friction rollers (r r), in order that the hoppers (F) may be refilled with clay from the main hopper (B), and causing the same to be forced to their extreme positions by the friction rollers (s s) secured to the cross-head (n), the operation of receiving the clay and molding the brick is effected with rapidity and precision.

(P) represents a gate which supports the mold (u) and is pivoted at its lower side to the frame (A). This gate being hinged at (l) is opened when the sliding head (h) is drawn back, as seen at Fig. 3, in order that the mold (u) may be changed. After the brick have been removed and the mold replaced by another, the gate is thrown up and locked in position, as seen in Fig. 4, in readiness to receive and mold the fresh clay forced into the mold (u) by the sliding head (h). During the process of removing the brick from the mold, the hopper (F) is being filled with prepared clay from the main hopper (B), as shown at Fig. 3.

(d) are partitions or guides placed in front of the mold in order to divide and direct the clay in equal portions into the several compartments of the mold. By thus dividing the clay previous to its being forced into the mold, the several compartments receive equal quantities, and the brick produced are of uniform density.

In order that the clay in the hoppers (F) may be separated from that pressed within the mold (u), I have prepared a cut-off (I), which is held in position by guides (q). This cut-off is pivoted at its lower side to a lever (J), the fulcrum of which is supported in a cross-bar (N), Fig. 1. From the fulcrum (b) this lever assumes nearly a horizontal position, as shown in dotted lines, forming what is commonly termed a "bell-crank." To operate this crank, the upper end is extended from the angle (w') perpendicularly, a sufficient distance to be operated upon by the friction wheel (p) secured to the lower side of the sweep (E). That the cut-off (I) may be replaced in its proper position to admit through its orifices (x, x,) corresponding with the mold the clay forced forward by the sliding head (h), I have arranged a second lever (w) which is likewise secured to the cross-bar (N) by a pivot (g). The upper extremity of this lever, previous to the separation of the clay, assumes an inclined position, while the lower end thereof extending from the fulcrum (g) forms an obtuse angle and rests against the lower side of the lever (J), as shown by dotted lines. It will therefore be readily understood that by rotating the sweep (E) the friction rollers (p) secured to its lower surface will be brought in contact with the upper end of the lever (J) causing the same to be forced in the direction indicated by the arrow. By depressing the lever (J), the lever (w) is caused by its lower bent end being in contact with the lever (J), to assume a perpendicular position, in which position, its upper extremity extends somewhat above that of the lever (J), so that as the friction roller (p) passes over the lever (J), causing the cut-off (I) to perform its stroke, the lever (w) by the friction roller in its turn is forced to its original position in readiness for a repetition of the above described operation.

It will be observed that by placing mechanism on the four sides of the frame, the two opposite molds will be operated simultaneously. In order therefore that the respective cut-offs shall correspond in motion to the several molds, I have placed corresponding friction rollers on the lower surface of the sweep (E), causing the two opposite cut-offs to perform their functions simultaneously and in quick succession after the clay has been pressed into the mold.

What I claim and desire to secure by Letters Patent, is—

1. I do claim the combination of the double cam or cams a at the end of the lever or levers K and attached to and acting upon the plunger or plungers by a link — with the cross arms m and n and their friction rollers, arranged and operating substantially as and for the purpose above set forth and described.

2. I further claim, for the purpose of operating the cut-off, the combination of the two levers J and w with the friction wheels p or their equivalents at the end of the sweep E, as set forth and described.

JOSEE JOHNSON.

Witnesses:
SAML. GRUBB,
F. D. CLEARY,
WM. D. ACKER.